United States Patent

Kaneko et al.

[11] Patent Number: 5,478,664
[45] Date of Patent: Dec. 26, 1995

[54] METHOD OF RECOVERING REUSABLE METALS FROM NICKEL-HYDROGEN RECHARGEABLE BATTERY

[75] Inventors: Akihito Kaneko, Sendai; Nobuyuki Kitazume, Himeji; Chikara Okada, Kobe, all of Japan

[73] Assignee: Santoku Metal Industry Co., Ltd., Kobe, Japan

[21] Appl. No.: 347,424

[22] PCT Filed: Apr. 5, 1994

[86] PCT No.: PCT/JP94/00560

§ 371 Date: Nov. 30, 1994

§ 102(e) Date: Nov. 30, 1994

[87] PCT Pub. No.: WO94/23073

PCT Pub. Date: Oct. 13, 1994

[30] Foreign Application Priority Data

Apr. 5, 1993 [JP] Japan ................................. 5-078172

[51] Int. Cl.⁶ ................................................. H01M 6/52
[52] U.S. Cl. ................................. 429/49; 204/64 R; 75/714
[58] Field of Search ............................. 75/714; 204/64 R; 429/49

[56] References Cited

U.S. PATENT DOCUMENTS 4,762,694  8/1988  Maroni et al. ........................ 204/64 R
5,173,277  12/1992  Montgomery et al. ................... 429/49

FOREIGN PATENT DOCUMENTS 2825266  12/1979  Germany .

OTHER PUBLICATIONS

Hurd et alo. *Recycling of Consumer Dry Cell Batteries*, Noyes Data Corporation, 1993, pp. 216–247.

*Primary Examiner*—Prince Willis, Jr.
*Assistant Examiner*—Carol Chaney
*Attorney, Agent, or Firm*—Darby & Darby

[57] ABSTRACT

A method of recovering a reusable metal from a nickel-hydrogen rechargeable battery characterized in that the method comprises crushing the nickel-hydrogen rechargeable battery to obtain a crushed material, separating alkali, organic substances and iron from the crushed material to obtain a separated component from which at least the alkali, organic substances and iron are separated, obtaining the reusable metal to be recovered as an oxide from the separated component by calcination, and processing the oxide by a molten salt electrolysis method with an electrolytic molten salt bath. According to this method for recovery, electrode materials effective for nickel-hydrogen rechargeable batteries and the like can be recovered efficiently and in a large amount in lower cost compared to the ordinary separation, purification and refining utilizing chemical processing.

14 Claims, No Drawings

METHOD OF RECOVERING REUSABLE METALS FROM NICKEL-HYDROGEN RECHARGEABLE BATTERY

FIELD OF ART

This invention relates to a method of recovering reusable metals from nickel-hydrogen rechargeable batteries effective for recycling nickel-hydrogen rechargeable batteries.

BACKGROUND OF THE INVENTION

Recently, the demand for rechargeable batteries have been rapidly increasing as electronic products become portable. On the other hand, nickel-hydrogen rechargeable batteries have been improved as batteries for unpollutive electric vehicles, for which expanded future demand has attracted attention. In this way, the expanded demand for nickel-hydrogen rechargeable batteries is expected in future since the nickel-hydrogen rechargeable batteries are superior in characteristics to the conventional nickel-cadmium batteries as well as causing fewer environmental problems. However, a method of recovering reusable metals from used nickel-hydrogen rechargeable batteries has not yet been established. This is because the recovery through the conventional chemical processing costs more than the employment of new raw materials. Therefore, development of a method of recovering reusable metals from demand-expanding nickel-hydrogen rechargeable batteries is desired for environmental reasons as well.

It is an object of the present invention to provide a method of recovering reusable metals from nickel-hydrogen rechargeable batteries, wherein reusable metals can be recovered from nickel-hydrogen rechargeable batteries efficiently with low cost, and effectively as well in the aspects of recycling and environment.

DISCLOSURE OF THE INVENTION

According to the present invention, there is provided a method of recovering a reusable metal from a nickel-hydrogen rechargeable battery comprising;

step (I) of crushing the nickel-hydrogen rechargeable battery to obtain a crushed material, and separating alkali, organic substances and iron from the crushed material to obtain a separated component from which at least the alkali, organic substances and iron are separated, step (II) of obtaining the reusable metal to be recovered as an oxide from the separated component by calcination, and step (III) of processing the oxide by a molten salt electrolysis method with an electrolytic molten salt bath.

BEST MODE FOR CARRYING OUT THE INVENTION

The present invention will now be explained in detail.

According to the present recovering method, the step (I) is first carried out, wherein nickel-hydrogen rechargeable batteries are crushed to obtain a crushed material, and alkali, organic substances and iron are separated from the crushed material to obtain a separated component from which at least the alkali, organic substances and iron are separated.

The nickel-hydrogen rechargeable batteries may be crushed by using a crusher such as a biaxial shearing-type crusher, preferably into, for example fine pieces of 5 mm or less.

The alkali may be separated from the crushed material such as by washing the crushed material.

The organic substances may be separated from the crushed material by, for example processing, by a wet gravity separation method using a commercially available wet gravity separator, the crushed material from which the alkali is separated. By the wet gravity separation method, the organic substances such as plastics, or separators may be separated.

The iron may be separated from the crushed material by, for example processing the crushed material from which the alkali and organic substances are separated by a separating process such as a magnetic separation method, a gravity separation method, or a sieve separation method. The magnetic separation may be performed, for example by an electromagnetic separator, the gravity separation may be performed, for example by a thickener or a wet cyclone, and the sieve separation may be performed, for example by a wet vibrating screen. These separating processes may be performed in combination.

In the aforementioned step (I), by separating the alkali, organic substances, and iron, a separated component from which at least the alkali, organic substances, and iron such as nickel, nickel hydroxide, and nickel-rare earth metal alloy powders are separated can be recovered from nickel-hydrogen rechargeable batteries. Additionally, other components which are not necessary for recovery such as cobalt, aluminum, or manganese, may be separated from the crushed material in the step (I) in addition to the alkali, organic substances, and iron.

According to the present recovery method, the step (II) is carried out, wherein the reusable metals to be recovered from the separated component are obtained as oxides through calcination.

The above step (II) may include, for example;

(a) a step of calcining the separated component to obtain a nickel oxide- and nickel-rare earth metal oxide-containing material;

(b) a step of dissolving the separated component in a mineral acid to obtain a dissolved material, precipitating rare earth metal ions and nickel ions in the dissolved material to obtain a rare earth metal and nickel-containing precipitate, and calcining the rare earth metal- and nickel-containing precipitate to obtain a high purity nickel oxide and rare earth metal oxide-containing material; or (c) a step of dissolving the separated component in a mineral acid to obtain a dissolved material, precipitating rare earth metal ions in the thus obtained dissolved material as fluorides, followed by filteration to separate the precipitate of fluorides from the remaining liquid, precipitating nickel ions in the separated remaining liquid to obtain a nickel-containing precipitate, and calcining the nickel-containing precipitate to obtain nickel oxide. Any of steps (a) to (c) can be carried out on one portion of the separated component of step I, and another of steps (a) to (c) carried out on a different portion of the separate component. It is therefore possible to carry out steps (a) and (b), and (c), (b) and (c) or (a), (b), and (c) on different portions of the separated component. The metal oxides obtained thereby from the different portions can the be combined in step III.

In the step (a), the separated component may be calcined preferably at 200° to 1000° C. for 2 to 10 hours. Through this step (a), oxides such as a nickel oxide- and nickel-rare earth metal oxide-containing material are recovered.

In the step (b), the mineral acid for dissolving the separated component may include nitric acid, hydrochloric acid, and the like. The rare earth metal ions and nickel ions in the dissolved material may be precipitated by adding, for example ammonium bicarbonate, alkali solutions, or mixtures thereof to the dissolved material obtained by dissolving the separated component in the mineral acid. The alkali solutions may include aqueous ammonia, caustic soda and the like. The amount of the ammonium bicarbonate, alkali solutions, or the mixtures thereof to be added is preferably 1.0 to 1.2 times more than the theoretical value of the amount necessary for precipitating the rare earth metal ions and nickel ions in the separated component. By adding ammonium bicarbonate and/or alkali solutions and the like as above, the rare earth metals, nickel carbonate and/or nickel hydroxide contained in the separated component are precipitated. The precipitate may be filtered by means of a publicly known filtering method. The precipitate may be calcined preferably at 300° to 1000° C. for 2 to 10 hours. Through the step (b) as described, oxides such as a high purity nickel oxide- and nickel-rare earth metal oxide-containing material are recovered. The high purity nickel oxide here means that it is higher in purity than the nickel oxide in the component recovered in the step (a).

in the step (c), the mineral acids for dissolving the separated component may include nitric acid, hydrochloric acid, and the like. The rare earth metal ions in the dissolved material may be precipitated as fluorides by adding, for example fluorine compounds such as hydrofluoric acid, ammonium fluoride, or mixtures thereof to the dissolved material. The amount of the fluorine compounds to be added is preferably 1.0 to 1.2 times more than the theoretical value of the amount necessary for precipitating the rare earth metal ions in the separated component. The filtration to separate the obtained precipitate of the fluorides of the rare earth metal ions from the remaining liquid may be performed by a publicly known method.

In the step (c), nickel ions are precipitated in the separated remaining liquid to obtain a nickel ion-containing material. The nickel ions may be precipitated, for example by adding ammonium bicarbonate and/or alkali solutions and the like to the remaining liquid. By adding ammonium bicarbonate and/or alkali solutions as above, a precipitate of nickel carbonate and/or nickel hydroxide is obtained. The alkali solutions may include aqueous ammonia, caustic soda and the like. The amount of the ammonium bicarbonate and/or the alkali solutions and the like to be added is preferably 1.0 to 1.2 times more than the theoretical value of the amount necessary for precipitating the nickel ions in the remaining liquid. Next, the obtained precipitate may be filtered and calcined by filtering the precipitate, for example by a publicly known method, followed by calcination, preferably at 200° to 1000° C. for 2 to 10 hours. Through the step (c) as described, oxides such as nickel oxide are recovered.

The precipitate obtained by separating from the remaining liquid in the above step (c), which is a fluoride of the rare earth metal ions, may be utilized as a raw material of one component in an electrolytic molten salt bath for a molten salt electrolysis to be described hereinbelow.

In the above step (II), when the step (c) and the step (a) and/or the step (b) are carried out in combination, in order to render the nickel oxide obtained through the step (c) to have a similar composition to the oxides obtained through the step (a) and/or step (b), fresh rare earth metal oxides may be added to the nickel oxide in the step (c) before being subjected to the molten salt electrolysis to be described hereinafter.

According to the present recovery method, the oxides obtained through the step (II) are processed by a molten salt electrolysis with an electrolytic molten salt bath in step (III). Through the step (III), desired reusable metals, for example rare earth metal-nickel alloys such as a mischmetal-nickel alloy, rare earth metals such as a mischmetal, and/or nickel can ultimately be recovered from nickel-hydrogen rechargeable batteries.

The molten salt electrolysis may be performed by a publicly known molten salt electrolysis method. In particular, as an electrolytic molten salt bath, for example, mixed salts of rare earth metal fluorides (referred to as $RF_3$, hereinafter), lithium fluoride (referred to as LiF hereinafter), and barium fluoride (referred to as $BaF_2$, hereinafter) may be used. The method may be carried out by charging the oxides obtained through the step (II) into the above electrolytic molten salt bath and electrolyzing the same while melting, preferably at a temperature between 700° to 1400° C. The $RF_3$ as a component of the electrolytic molten salt bath may include $RF_3$ obtained, for example, through the steps of crushing nickel-hydrogen rechargeable batteries to obtain a crushed material, separating alkali, organic substances and iron from the crushed material to obtain a separated component from which at least the alkali, organic substances and iron are separated, dissolving the separated material in mineral acids to obtain a dissolved material, precipitating rare earth metal ions in the obtained dissolved material as fluorides followed by filteration to separate the precipitate of fluorides from the remaining liquid, and calcining the separated precipitate of fluorides. In other words, the precipitate of fluorides obtained by separation from the remaining liquid in the step (c) may be used as a raw material component of $RF_3$ as a component of the electrolytic molten salt bath. The precipitate of fluorides may be calcined under the same conditions as in the calcination in the step (c).

The mixing ratio by weight of each component in the electrolytic molten salt bath, i.e., $RF_3$:LiF:$BaF_2$ is preferably 1:0.1~0.4:0.08~0.3.

In the electrolytic molten salt bath, in addition to the oxides obtained through the step (II), rare earth metal oxides other than the above oxides may be mixed in the electrolytic molten salt bath. The rare earth metal oxides other than the above oxides are not particularly limited as long as they are the oxides of rare earth metals normally used as raw materials for nickel-hydrogen rechargeable batteries, and may preferably include as raw materials a mischmetal and the like. The mixing ratio by weight of the rare earth metal oxides other than the above oxides is preferably 0.3~13 relative to 1 of the oxides in the step (II). By mixing the aforementioned rare earth metal oxides other than the above oxides, reusable metals can be recovered more easily since the metals to be recovered such as alloys contain a higher ratio of rare earth metals and have lowered melting points so that the processing conditions for molten salt electrolysis are moderated.

The reusable metals obtained through the present recovery method may be recycled as alloys for electrodes of nickel-hydrogen rechargeable batteries by, after mixing the alloy components, melting under an argon atmosphere or in a vacuum high frequency melting furnace. In this case, the low content of metals such as cobalt, aluminum, or maganese added to the electrode materials does not at all affect the characteristics of the recycled electrode materials, thus not being limited particularly.

According to the present recovery method, reusable metals can be recovered efficiently from nickel-hydrogen rechargeable batteries, thereby enabling not only recycle but also mass recovery of effective electrode materials in lower cost compared to the ordinary separation, purification and refining utilizing chemical processing.

EXAMPLE

The present invention will now be described further in detail hereinbelow with reference to the examples, but is not limited to these.

Example 1

Used nickel-hydrogen rechargeable batteries (containing 82 g of materials for positive electrodes and 151 g of materials for negative electrodes necessary for recovery) were crushed by a biaxial shearing-type crusher into fine pieces of 5 mm or less before charging into a container with agitators, and agitated under flowing water to remove and overflow alkali. Then after organic substances were eliminated by a wet gravity separator, iron in the remaining metals was removed by a wet electromagnetic vibration sieve followed by filteration to recover nickel and nickel-rare earth metal powders.

Next the recovered nickel and nickel-rare earth metal powders were calcined in an electric furnace at 800 for 2 hours to obtain 194 g of metal oxides in terms of metals in the yield of 83.3%. The obtained metal oxides were charged into an electrolytic molten salt bath containing 65 weight % of $RF_3$, 20 weight % of LiF and 15 weight % of $BaF_2$ while being electrolyzed at 1000° C. 145.3 g of metals were obtained and the yield from the metal oxides was 74.9%. The composition of the obtained metals by weight ratio was 28.9% of rare earth metals, 65.2% of nickel, 3.6% of cobalt, 0.6% of aluminum, and 1.7% of manganese.

Example 2

Used nickel-hydrogen rechargeable batteries (containing 840 g of materials for positive and negative electrodes necessary for recovery) were crushed by a biaxial shearing-type crusher into fine pieces of 5 mm or less and alkali, organic substances, and iron were removed and filtered off as in the Example 1 to recover nickel and nickel-rare earth metal powders.

Next, the recovered nickel and nickel-rare earth metal powders were dissolved in nitric acid, to which an aqueous solution containing 220 g of ammonium fluoride was charged, thereby precipitating rare earth metals as fluorides followed by filteration, and the filtered precipitate was calcined at 700° C. to obtain 396 g of $RF_3$. On the other hand, to the filterate obtained by filtering off the precipitate of the rare earth metals as fluorides were charged 1130 g of ammonium bicarbonate and 2275 ml of 20% aqueous ammonia, thereby precipitating nickel ions as nickel carbonate, and after filteration, the resulting precipitate was calcined at 800° C. to obtain 728 g of nickel oxide. The yield was 84.1%.

Then the obtained $RF_3$ a was mixed with LiF and $BaF_2$ to prepare an electrolytic molten salt bath with the composition ratio of $RF_3$:LiF:$BaF_2$ therein being 65:20:15. Into an electrolytic furnace utilizing this bath were charged 100 g of metal oxides prepared in Example 1, 728 g of the nickel oxide, and 700 g of mischmetal raw materials as rare earth metal oxides while being electrolyzed at 960° C., thereby obtaining 1117.5 g of a rare earth metal-nickel alloy. The composition of the obtained alloy by weight ratio was 49.8% of rare earth metals, 49.9% of nickel, 0.2% of cobalt, and 0.1% of manganese. The yield of the metals from the oxides was 89.3%.

Example 3

The $RF_3$ obtained by the same process as in the Example 2 was mixed with LiF and $BaF_2$ to prepare an electrolytic molten salt bath with the composition ratio of $RF_3$:LiF:$BaF_2$ therein being 65:20:15. Into an electrolytic furnace utilizing this bath were charged metal oxides obtained by the same process as in the Example 1 while being electrolyzed at 1050° C., thereby obtaining a rare earth metal-nickel alloy in the yield of 75.5%.

Example 4

A mixture of 700 g of nickel oxide obtained by the same process as in the Example 2 and 1000 g of mischmetal raw materials as rare earth metal oxides were charged into an electrolytic molten salt bath containing 65 weight % of $RF_3$, 20 weight % of LiF, and 15 weight % of $BaF_2$ while being electrolyzing at 950° C. 1310 g of metals were obtained and their composition by weight ratio were 60% of mischmetal and 40% of nickel. The yield of nickel from the nickel oxide was 92%.

Example 5

Used nickel-hydrogen rechargeable batteries (containing 840 g of materials for positive and negative electrodes necessary for recovery) were crushed by a biaxial shearing-type crusher into fine pieces of 5 mm or less, and alkali, organic substances, and iron were removed and filtered off as in the Example 1 to recover nickel and nickel-rare earth metal powders.

Then, the recovered nickel and nickel-rare earth metal powders were dissolved in nitric acid and the insolubles were filtered off. To the remaining liquid after filteration were added 1273 g of ammonium bicarbonate and 2561 ml of 20% aqueous ammonia, thereby precipitating and obtaining by filteration mixed carbonates of nickel and rare earth metals. The obtained precipitate was calcined at 800° C. for 10 hours to obtain 1051 g of nickel-rare earth metal oxides in the yield of 80.7%. The obtained nickel-rare earth metal oxides were charged to an electrolytic molten salt bath of the same composition as in the Example 1 while being electrolyzed at 1020° C. 722 g of metals were obtained, and the yield from the metal oxides were 85.6%. The composition of the metals by weight ratio was 29.6% of rare earth metals, 66.7% of nickel, and 3.7% of cobalt.

Example 6

$RF_3$ obtained by the same process as in the Example 2 was mixed with LiF and $BaF_2$ to prepare an electrolytic molten salt bath with the composition ratio by weight of $RF_3$:LiF:$BaF_2$ therein being 65:20:15. Into an electrolytic furnace utilizing this bath were charged nickel-rare earth metal oxides obtained by the same process as in the Example 5 while being electrolyzed at 1050° C., thereby obtaining rare earth metal-nickel alloys in the yield of 87.3%.

Example 7

$RF_3$ obtained by the same process as in the Example 2 was mixed with LiF and $BaF_2$ to prepare an electrolytic molten salt bath with the composition ratio by weight of $RF_3$:LiF:$BaF_2$ therein being 65:20:15. In an electrolytic furnace utilizing this bath were mixed 100 g of metal oxides obtained by the same process as in the Example 1 and 100 g of nickel-rare earth metal oxides obtained by the same process as in the Example 5 while being electrolyzed at 1000° C. 138.6 g of rare earth metal-nickel alloy was obtained and the yield was 86.4%. The composition of the alloy by weight ratio was 29.2% of rare earth metals, 65.9% of nickel, 3.7% of cobalt, 0.3% of aluminum, and 0.9% of manganese.

Example 8

150 g of metal oxides obtained by the same process as in Example 1 and 200 g of mischmetal raw materials as rare earth metal oxides were mixed and charged to an electrolytic molten salt bath containing 65 weight % of $RF_3$, 20 weight % of LiF, and 15 weight % of BaF while being electrolyzed at 950%. 268.6 g of metals were obtained and the metal composition by weight ratio was 70.6% of rare earth metal, 27.0% of nickel, 1.5% of cobalt, 0.2% of aluminum, and 0.7% of manganese.

We claim:

1. A method of recovering a reusable metal from a nickel-hydrogen rechargeable battery comprising;
   step (I) of crushing said nickel-hydrogen rechargeable battery to obtain a crushed material, and separating alkali, organic substances and iron from said crushed material to obtain a separated component from which at least said alkali, organic substances and iron are separated,
   step (II) of obtaining said reusable metal to be recovered as an oxide from said separated component by calcination, and
   step (III) of processing said oxide by a molten salt electrolysis method with an electrolytic molten salt bath.

2. The method of recovering a reusable metal as claimed in claim 1 wherein said step (II) is selected from the group consisting of;
   (a) a step of calcining said separated component to obtain a nickel oxide- and nickel-rare earth metal oxide-containing material,
   (b) a step of dissolving said separated component in a mineral acid to obtain a dissolved material, precipitating a rare earth metal ion and a nickel ion in said dissolved material to obtain a rare earth metal- and nickel-containing precipitate, and calcining said rare earth metal- and nickel-containing precipitate to obtain a high purity nickel oxide- and rare earth metal oxide-containing material, and
   (c) a step of dissolving said separated component in a mineral acid to obtain a dissolved material, precipitating a rare earth metal ion in said dissolved material as a fluoride followed by filtration to separate a precipitate of said fluoride from a remaining liquid, precipitating a nickel ion in said separated remaining liquid to obtain a nickel-containing precipitate, and calcining said nickel-containing precipitate to obtain a nickel oxide.

3. The method of recovering a reusable metal as claimed in claim 2 wherein said rare earth metal ion and said nickel ion in said step (b) are precipitated by adding an additive component selected from the group consisting of solid ammonium bicarbonate, an alkali solution, and mixtures thereof to said dissolved material obtained by dissolving said separated component in said mineral acid.

4. The method of recovering a reusable metal as claimed in claim 2 wherein said nickel ion in said remaining liquid is precipitated by adding an additive component selected from the group consisting of solid ammonium bicarboriate, an alkali solution, and mixtures thereof to said remaining liquid.

5. The method of recovering a reusable metal as claimed in claim 1 wherein said electrolytic molten salt bath comprises a mixed salt of a rare earth metal fluoride, lithium fluoride, and barium fluoride.

6. The method of recovering a reusable metal as claimed in claim 5 wherein said rare earth metal fluoride comprises a rare earth metal fluoride obtained by crushing a nickel-hydrogen rechargeable battery to obtain a crushed material, separating alkali, organic substances and iron from said crushed material to obtain a separated component from which at least said alkali, organic substances and iron are separated, dissolving said separated component in a mineral acid to obtain a dissolved material, precipitating a rare earth metal ion in the obtained dissolved material as a fluoride followed by filteration to separate a precipitate of said fluoride from a remaining liquid, and calcining said separated precipitate of said fluoride.

7. The method of recovering a reusable metal as claimed in claim 6 wherein said rare earth metal ion is precipitated as said fluoride by adding a fluorine compound selected from the group consisting of hydrofluoric acid, ammonium fluoride, and mixtures thereof.

8. The method of recovering a reusable metal as claimed in claim 1 or 5 wherein a rare earth metal oxide other than said oxide obtained in said step (II) is contained in said electrolytic molten salt bath.

9. The method of recovering a reusable metal as claimed in claim 1 wherein said molten salt electrolysis is performed at a temperature between 700° and 1400° C.

10. The method of recovering a reusable metal as claimed in claim 1 wherein said reusable metal to be recovered is selected from the group consisting of a rare earth metal-nickel alloy, a rare earth metal, nickel and mixtures thereof.

11. The method of recovering a reusable metal as claimed in claim 2 wherein said step (a) is carried out to obtain said oxide of said reusable metal, further wherein step (b) is carried out to obtain said oxide of said reusable metal from a different portion of said separated component.

12. The method of recovering a reusable metal as claimed in claim 2 wherein said step (a) is carried out to obtain said oxide of said reusable metal, further wherein step (c) is carried out to obtain said oxide of said reusable metal from a different portion of said separated component.

13. The method of recovering a reusable metal as claimed in claim 2 wherein said step (b) is carried out to obtain said oxide of said reusable metal, further wherein step (c) is carried out to obtain said oxide of said reusable metal from a different portion of said separated component.

14. The method of recovering a reusable metal as claimed in claim 2 wherein said step (a) is carried out to obtain said oxide of said reusable metal, further wherein step (b) is carried out to obtain said oxide of said reusable metal from a different portion of said separated component, still further wherein step (c) is carried out to obtain said oxide of said reusable metal from a still different portion of said separated component.

* * * * *